W. GARDINER.
BATTERY CONSTRUCTION.
APPLICATION FILED FEB. 7, 1916.

1,262,581.

Patented Apr. 9, 1918.
2 SHEETS—SHEET 1.

Witnesses:
Robert H. Weir
Arthur W. Carloy

Inventor
William Gardiner
By Charles C. Bulkley
Attys

W. GARDINER.
BATTERY CONSTRUCTION.
APPLICATION FILED FEB. 7, 1916.
1,262,581.
Patented Apr. 9, 1918.
2 SHEETS—SHEET 2.
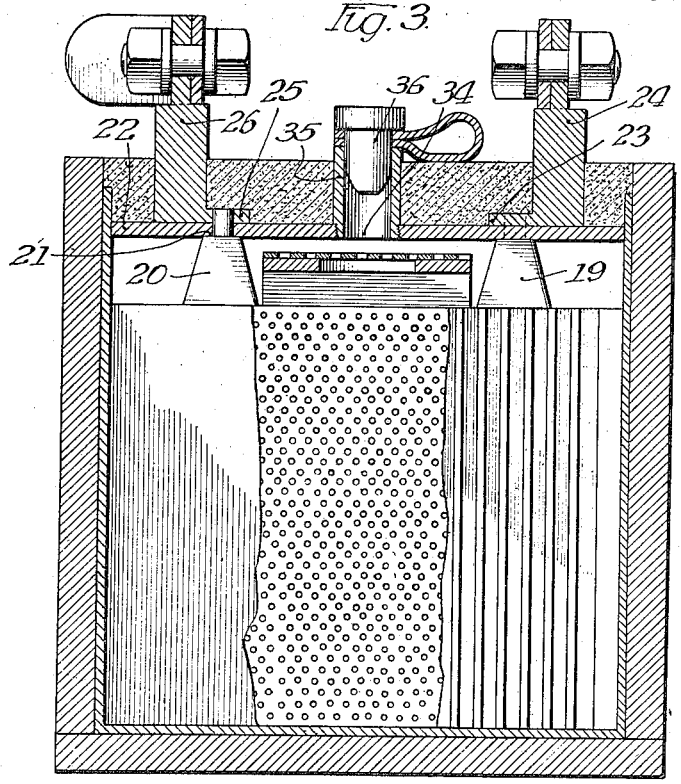
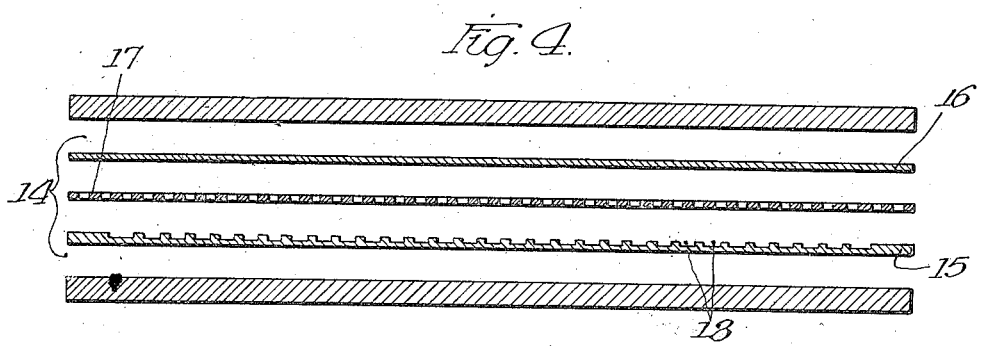
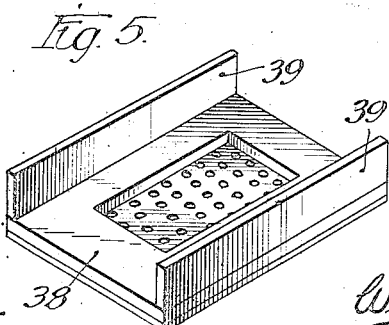

UNITED STATES PATENT OFFICE.

WILLIAM GARDINER, OF CHICAGO, ILLINOIS, ASSIGNOR OF ONE-THIRD TO JOHN P. O'SHAUGHNESSY AND ONE-THIRD TO MARTIN O'SHAUGHNESSY, OF CHICAGO, ILLINOIS.

BATTERY CONSTRUCTION.

1,262,581.  Specification of Letters Patent.  Patented Apr. 9, 1918.

Application filed February 7, 1916. Serial No. 76,511.

*To all whom it may concern:*

Be it known that I, WILLIAM GARDINER, a citizen of the United States of America, and resident of Chicago, Cook county, Illinois, have invented a certain new and useful Improvement in Battery Construction, of which the following is a specification.

My invention relates to improvements in battery construction, and relates particularly to electric storage batteries, although certain features thereof are adapted for more general use.

One of the objects of my invention is to provide an improved separator for use in connection with batteries, which separator is of such construction as to readily permit the escape of gases and thoroughly insulate the plates from one another, so that there is no danger of short-circuiting.

A further object of my invention relates to an improved construction whereby a proper amount of liquid is always retained in the battery.

A further feature of my invention relates to an improved terminal for connecting the battery lead with a suitable cable.

These and other objects and features of my invention will be more readily understood by having reference to the accompanying drawings, in which I have illustrated one embodiment of my invention.

In the drawings:—

Fig. 3 is a transverse vertical section.

Fig. 4 is a detail view showing the construction of the separator and its relation to two adjacent plates.

Fig. 5 is a detail view.

Figure 1:
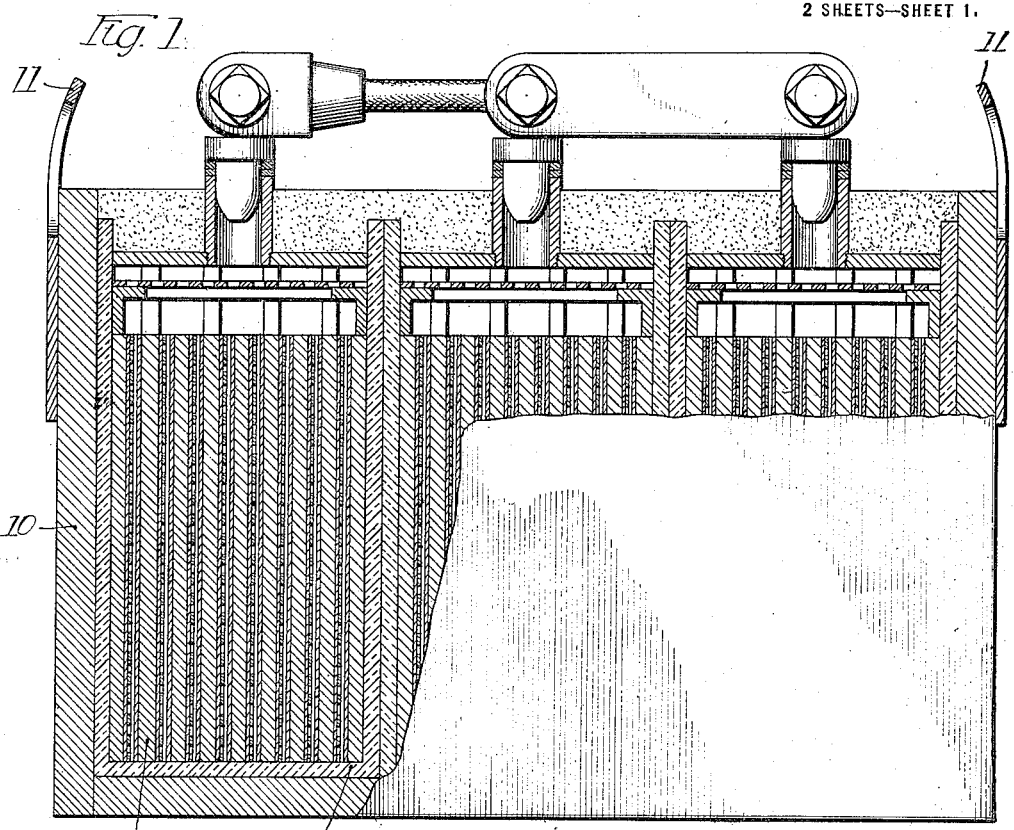
Figure 1 is a central longitudinal section of an electric battery embodying my invention.

In the drawings, I have illustrated a portable battery, such as employed in connection with automobiles, although, of course, it will be understood that my invention is equally as well adapted for use in connection with batteries of other types. This battery, as illustrated, consists of three units or cells contained within a casing 10 made of wood or other suitable material, this casing being provided with a pair of handles 11. Each cell consists of a plurality of plates 12, situated in a suitable container 13 which is preferably rectangular in shape and of such size that three of these cells can be conveniently grouped within the outer container 10, although, of course, varying numbers of these cells could be mounted in a single container, if desired. Mounted between each pair of plates is a separator 14, which consists of three parts, as clearly indicated in Fig. 4. Each separator consists, first, of a ribbed plate 15 made of suitably prepared wood, and a similar flat plate 16 of wood, between which plates there is located a perforated sheet of hard rubber 17, or other suitable insulating material. By this construction, when these three parts are mounted together, a series of vertical grooves 18 are formed which readily provide for the escape of any gases formed in the battery, while the perforated rubber plate thoroughly insulates the two plates from one another, thus preventing any danger of leakage or short-circuiting between these plates. The plates are arranged alternately, positive and negative, each positive plate being provided with an upwardly projecting terminal 19 located upon one end of these plates, while the negative plates are each provided with an upwardly extending terminal 20 located on the opposite end of these plates. These terminals are each provided with a shoulder 21 near the upper ends, upon which shoulders a suitable cover 22 is mounted, this cover being provided with suitable perforations to permit the upper ends of the terminals to project through this cover. The upper ends of the positive terminals are electrically connected together by a suitable connecting strip 23, which strip is provided with an upwardly extending terminal member 24. The negative terminals are similarly connected together by a metallic member 25, provided with an upwardly extending connecting member 26. The three cells or units are then connected in series by means of suitable connecting bars 27, 28, as clearly indicated in Fig. 2.

Figure 2:
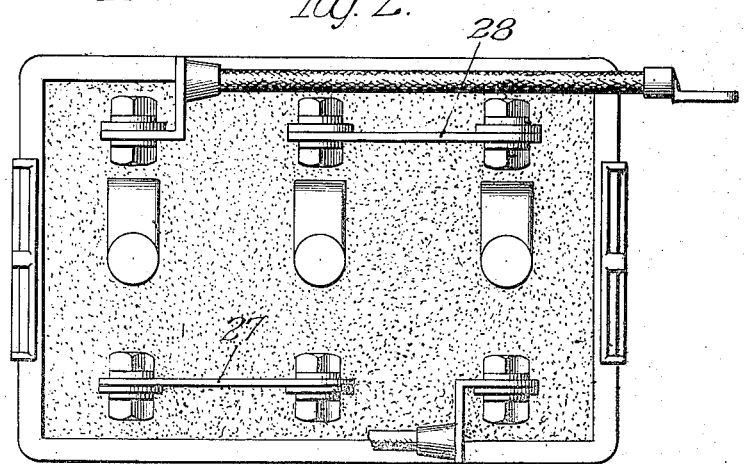
Fig. 2 is a top plan view of the same.

Suitable connecting cables are connected to the end terminals of the series, and in order to connect these cables with an outside cable, I provide a novel and efficient connector as shown in Fig. 2. As there indicated, the cable 29 terminates in a metal plug 30 which is provided with a screw-threaded bore to permit the reception of the screw 30ª. Loosely mounted on this conical plug, there is a cylindrical metal sleeve 31 having a conical inside face. The outside cable 32 is provided with a suitable terminal 33, provided with a flat portion 34 through which the screw 30ª is adapted to pass. With this construction, it will be seen that as the screw 30ª is tightened, the conical member 30 is forced into the conical metallic sleeve 31, and owing to the inclined face on which these two members engage, a very tight and firm metallic engagement is insured, thus making a very efficient electrical connection between the two cables 29 and 32.

The cover plates 22 are each provided with a central opening 34, in which is mounted an upstanding tube or cylinder 35 through which access may be obtained to the interior of the battery for flushing the cells, or for removing the liquid contents of the same, or for any other desired purpose.

In order to close these openings, however, while the battery is in use, a suitable plug 36 is provided. In practice, it is found that these plugs are very easily lost or mislaid, and to prevent this I provide flexible means for securing the plug to the top of the battery, this means consisting of a flexible strip 37 made of rubber or other suitable material, one end of which is vulcanized or otherwise suitably secured to the plug 36, while the other end is vulcanized or otherwise suitably secured to the top of this cylindrical member 35.

In practice, it is found that either too much liquid is retained in the cells, thus causing the same to slop over when the batteries are moved about, or if an attempt is made to withdraw a suitable amount of the liquid to prevent this slopping over by means of the ordinary suction bulb and tube, it frequently occurs that too much of the liquid is withdrawn so that the plates are not fully covered and thus the most efficient action of the battery is not secured. In order to obviate these disadvantages, I provide a perforated member 38 provided with two downwardly extending flanges 39, which member spans a group of plates and separators in the cell, the flanges 39 resting upon two of the outside plates. These flanges are of such a height that they maintain the top of the plate 39 about three-eighths of an inch above the top of the battery plates and separators in the cell. The position of this member is clearly indicated in Fig. 3 of the drawings, while the detail construction of the same is readily apparent from an inspection of Fig. 5. With this member in position beneath the opening 34, the operator of the battery is then instructed to withdraw all the liquid that he can by means of the suction bulb and tube. This perforated plate 38 prevents the tube from descending lower in the cell than this plate, and thus it is impossible to lower the level of the liquid below the top of this plate, and thus after all the liquid has been withdrawn that can be withdrawn by means of the suction bulb, the liquid still rises to a level about three-eighths of an inch above the top of the plates, thus thoroughly covering the same and insuring efficient operation of the battery, and yet not being such an excess of liquid as will cause danger of the same slopping over when the battery is moved and jarred. The height at which this perforated plate is maintained above the battery plates can, of course, be varied, but it is found in practice that three-eighths of an inch is about the desired height to give the best results.

It will thus be seen that I have devised a very efficient battery in which a very efficient form of separator is provided which is so constructed as to prevent the active material from working loose from the electrode plates and thus short circuiting the battery. Likewise with my construction the proper amount of liquid can always be readily maintained in the battery while certain other novel features of construction above referred to all coöperate to produce a very effective battery construction.

While I have thus described one specific embodiment of my invention in connection with a certain type of battery, it will, of course, be understood that I do not wish to be limited to the exact construction shown and described, but that my invention is equally as well adapted for use in connection with batteries of other types and that in fact certain features of the invention, such, for instance, as the terminal connection, is capable of even broader use.

What I claim as my invention is:

1. In battery construction, a separator consisting of a flat imperforate plate of insulating material, a second plate having a plurality of vertical grooves located adjacent to said first plate, and a perforated sheet of insulating material between said plates.

2. In a battery construction, a separator consisting of two members of porous insulating material having plain outer surfaces, and a plurality of ridges on the inner surface of one of said members to thereby form a plurality of vertical channels between the two members.

3. In a battery construction, a separator consisting of two members of porous insulating material having plain outer surfaces, a plurality of ridges on the inner surface of one of said members to thereby form a plurality of vertical channels between the two members, and a sheet of non-porous insulating material between said members.

Signed by me at Chicago, Illinois, this 25th day of January, 1915.

WILLIAM GARDINER.

Witnesses:
 AMY JEHLE,
 E. H. CLEGG.